US006803676B2

United States Patent
Tanaka et al.

(10) Patent No.: US 6,803,676 B2
(45) Date of Patent: Oct. 12, 2004

(54) WIRELESS CONTROLLER AND POWER SUPPLY METHOD THEREOF

(75) Inventors: Makoto Tanaka, Tokyo (JP); Toru Akazawa, Tokyo (JP); Rajesh Kumar Dixit, Tokai (JP)

(73) Assignee: Sony Computer Entertainment Inc. (JP)

( * ) Notice: Subject to any disclaimer, the term of this patent is extended or adjusted under 35 U.S.C. 154(b) by 206 days.

(21) Appl. No.: 10/054,096

(22) Filed: Jan. 22, 2002

(65) Prior Publication Data

US 2002/0105229 A1 Aug. 8, 2002

(30) Foreign Application Priority Data

Jan. 23, 2001 (JP) ..................................... P2001-015054

(51) Int. Cl.⁷ ............................................... A63F 13/00
(52) U.S. Cl. .............................. 307/28; 307/18; 463/39
(58) Field of Search ............................. 307/28, 29, 18; 463/39

(56) References Cited

U.S. PATENT DOCUMENTS 6,139,399 A * 10/2000 DeAngelis ................... 463/39

2001/0012802 A1 * 8/2001 Nishiumi et al. ............. 463/37
2002/0072410 A1 * 6/2002 Tanaka et al. ................ 463/37

FOREIGN PATENT DOCUMENTS

| JP | 1135163 | 5/1989 | |
| JP | 7240968 | 9/1995 | |
| JP | 2000-126466 | * 5/2000 | ........... A63F/13/08 |
| JP | 2000-218048 | * 8/2000 | ........... A63F/13/00 |

* cited by examiner

*Primary Examiner*—Brian Sircus
*Assistant Examiner*—Robert J. Rios
(74) *Attorney, Agent, or Firm*—Lerner, David, Littenberg Krumholz & Mentlik, LLP

(57) ABSTRACT

A wireless controller is provided with at least two power supplies. The internal components of the controller are classified into at least two groups in accordance with the degrees of functional importance or the power consumptions of the components. The power supplies separately supply electric power to the respective groups of the components. Thus, the power supply to components with high degrees of functional importance or low power consumptions is ensured for a long time.

12 Claims, 4 Drawing Sheets

WIRELESS CONTROLLER AND POWER SUPPLY METHOD THEREOF

CROSS-REFERENCE TO RELATED APPLICATIONS

This application claims priority from Japanese Patent Application No. 2001-15054 filed on Jan. 23, 2001, the disclosure of which is hereby incorporated by reference herein.

BACKGROUND OF THE INVENTION

The present invention relates to wireless controllers for remote-controlling predetermined electronic devices through wireless communication, and also to power supply methods of the controllers.

A conventional video game machine is generally made up from a game machine main body for executing a video game by controlling the action of a game character or the like, and a game controller to be operated by a game player. The game controller is provided with various operation buttons, keys, etc, to be operated by the player. The game controller is further provided with an LED (Light Emitting Diode) for informing the player of, e.g., an operation mode, or may be provided with a vibration mechanism in which a weight is eccentrically mounted on the rotational axis of an electric motor to vibrate the body of the game controller.

In general, the game controller is connected with the game machine main body through a cable. The game controller sends operation signals that indicate operated states of the above-described operation buttons and so on to the game machine main body. The game machine main body supplies electric power to the game controller. Besides, the game machine main body sends various control signals for controlling, e.g., ON/OFF of the LED and the operation of the vibration mechanism, to the game controller.

Recently, to avoid the inconvenience that the cable is a hindrance to handling the game controller and the cable length restricts the distance between the game machine main body and the game controller, it has been suggested to connect the game controller with the game machine main body by wireless using, e.g., infrared rays or low-power RF (Radio Frequency) signals.

If the game controller is connected with the game machine main body by wireless, the power for the game controller would likely have to be supplied from a battery (primary or secondary battery).

Such a battery, however, has a limit in its capacity, even though the playing of a game may continue for a long time. It is therefore desirable that such a game controller be designed to operate for as long a time as possible within the limited battery capacity.

SUMMARY OF THE INVENTION

An object of the present invention is to provide wireless controllers, such as game controllers and the like, to communicate with video game machine main bodies by wireless communication, and operable for a long time even with a limited battery capacity.

A further object of the present invention is to provide a method of supplying power to such a controller.

According to the present invention, the internal components of a wireless controller for remote-controlling a predetermined electronic device through wireless communication are classified into at least two groups in accordance with the degrees of functional importance and/or the power consumptions of the components. A separate power supply system is provided for each group of components.

In this manner, for at least one group of components (e.g., whose functions are highly important or whose power consumptions are low), a power supply for a long time can be ensured.

Further particular and preferred aspects of the present invention are set out in the accompanying independent and dependent claims. Features of the dependent claims may be combined with features of the independent claims as appropriate, and in combinations other than those explicitly set out in the claims.

DETAILED DESCRIPTION

Figure 1:
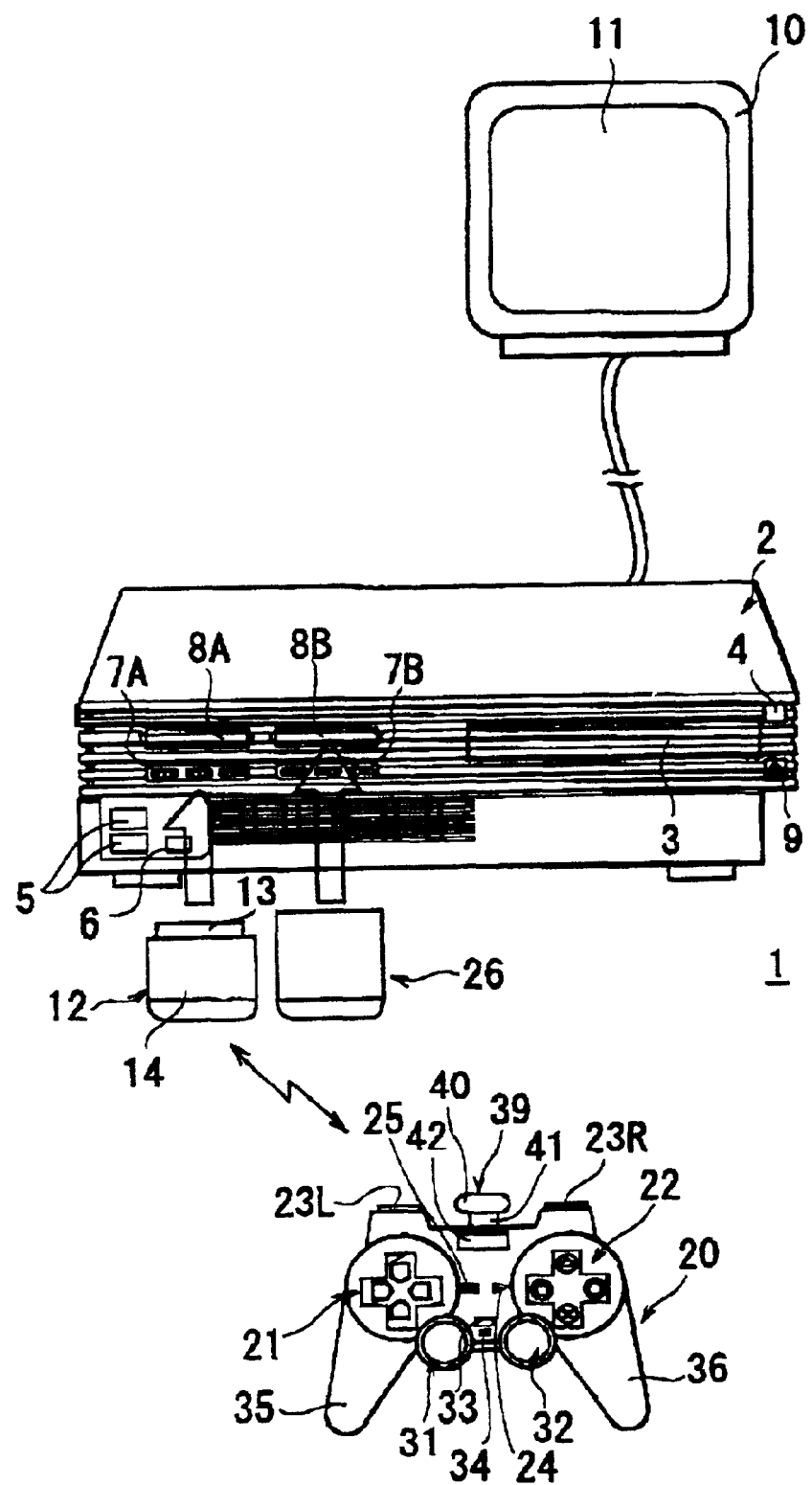
FIG. 1 illustrates the general construction of a video game system according to an embodiment of the present invention.

An embodiment of the present invention will be described with reference to the accompanying drawings. It is to be noted that the same or similar reference numerals are applied to the same or similar parts and elements throughout the drawings, and the description of the same or similar parts and elements will be omitted or simplified.

Video Game System of Present Embodiment

FIG. 1 illustrates the general construction of a video game system 1 as an embodiment, to which a wireless controller and a power supply method of such controller according to the present invention can be applied.

The video game system 1 of this embodiment includes a game machine main body 2 and a game controller 20. The game controller 20 through which a player plays a video game is connected with the game machine main body 2 by wireless, i.e., without using any cable. The game machine main body 2 and the game controller 20 are provided with transceivers 12 and 39, respectively, for two-way wireless communication with each other. The video game system 1 further includes a television receiver 10 having a monitor screen 11 on which a picture of a game, a television image, or the like, is displayed.

In the example of FIG. 1, both the game machine main body 2 and the game controller 20 have no wireless communication function in itself, so that the transceivers 12 and 39 are externally attached to them for wireless communication. If either of the game machine main body 2 and the game controller 20 has a wireless communication function in itself, such transceivers 12 and 39 are not needed.

Outline of Game Machine Main Body

Although the detailed description of the internal circuit construction is omitted, the game machine main body 2 is provided with memory card slots 8A and 8B into each of which a memory card 26 can be inserted, controller ports 7A and 7B to any one of which the above-described transceiver 12 can be connected, a disk tray 3 on which an optical disk such as a DVD-ROM or a CD-ROM is loaded, an open/close button 9 for opening/closing the disk tray 3, an on/standby/reset button 4 for power-on/standby/game reset, an IEEE (Institute of Electrical and Electronics Engineers) 1394 connection terminal 6, two USB (Universal Serial Bus) connection terminals 5, and so on. Although the illustration is omitted, the game machine main body 2 is provided on its rear face with a power switch, audio/video output terminals (AV multi-output terminals), a PC-card slot, an optical digital output terminal, an AC-power input terminal, and so on. If necessary, a drive bay for mounting a hard disk drive may also be provided in the game machine main body 2.

The game machine main body 2 executes a game on the basis of a game application program and operation signals received from the game controller 20 through the transceivers 39 and 12. The game application program is read out from an optical disk such as a CD-ROM or a DVD-ROM loaded on the disk tray 3, or read out from a semiconductor memory or the like. In another example, the game application program may be downloaded through a communication line such as a telephone line, a LAN, a CATV line, or a communication satellite line. For executing a game, the game machine main body 2 controls various images in the game (game image) displayed on the monitor screen 11 of the television receiver 10 connected with the game machine main body 2, and sound (game sound) generated by an audio system, mainly on the basis of operation signals from the game controller 20. A memory card 26 inserted in the memory card slot 8A or 8B is for storing (saving) various game data midway through the game. When the game is restarted, the saved data can be used.

Besides, the game machine main body 2 not only can execute such a video game based on a game application program, but also can reproduce (decode) audio data recorded on a CD and video/audio data recorded on a DVD, such as a movie. Further, the game machine main body 2 can operate on the basis of various other application programs.

Outline of Transceiver

Although the detailed description of the internal circuit construction is omitted, the transceiver 12 to be connected to the game machine main body 2 is provided with a connector 13 to be attached to the controller port 7A or 7B of the game machine main body 2 for electrical connection, a communication circuit for two-way communication with the game machine main body 2 through the controller port 7A or 7B, a communication circuit for two-way communication with the transceiver 39 of the game controller 20, and a transmitting/receiving section for transmitting/receiving signals by wireless. The transceiver 12 illustrated in FIG. 1 is provided in its casing 14 with the above-described communication circuits and transmitting/receiving section.

Also, although the detailed description of the internal circuit construction is omitted, the transceiver 39 to be connected to the game controller 20 is provided with a connector to be attached to a not-illustrated connection port provided on the game controller 20 for electrical connection, a communication circuit for two-way communication with the game controller 20 through the connection port, a communication circuit for two-way communication with the transceiver 12 of the game machine main body 2, and a transmitting/receiving section 40 for transmitting/receiving signals by wireless. The transceiver 39 illustrated in FIG. 1 is provided in its casing 41 with the above-described communication circuits. In another example, the transceiver 39 may be incorporated in the game controller 20 or united with the game controller 20 so as not to be detachable.

The transceivers 12 and 39 make point-to-point two-way wireless communication with each other using, e.g., an infrared communication, a general short-distance high-speed radio communication system such as Bluetooth (trademark), or an exclusive short-distance high-speed radio communication system.

Outline of Game Controller

Figure 2:
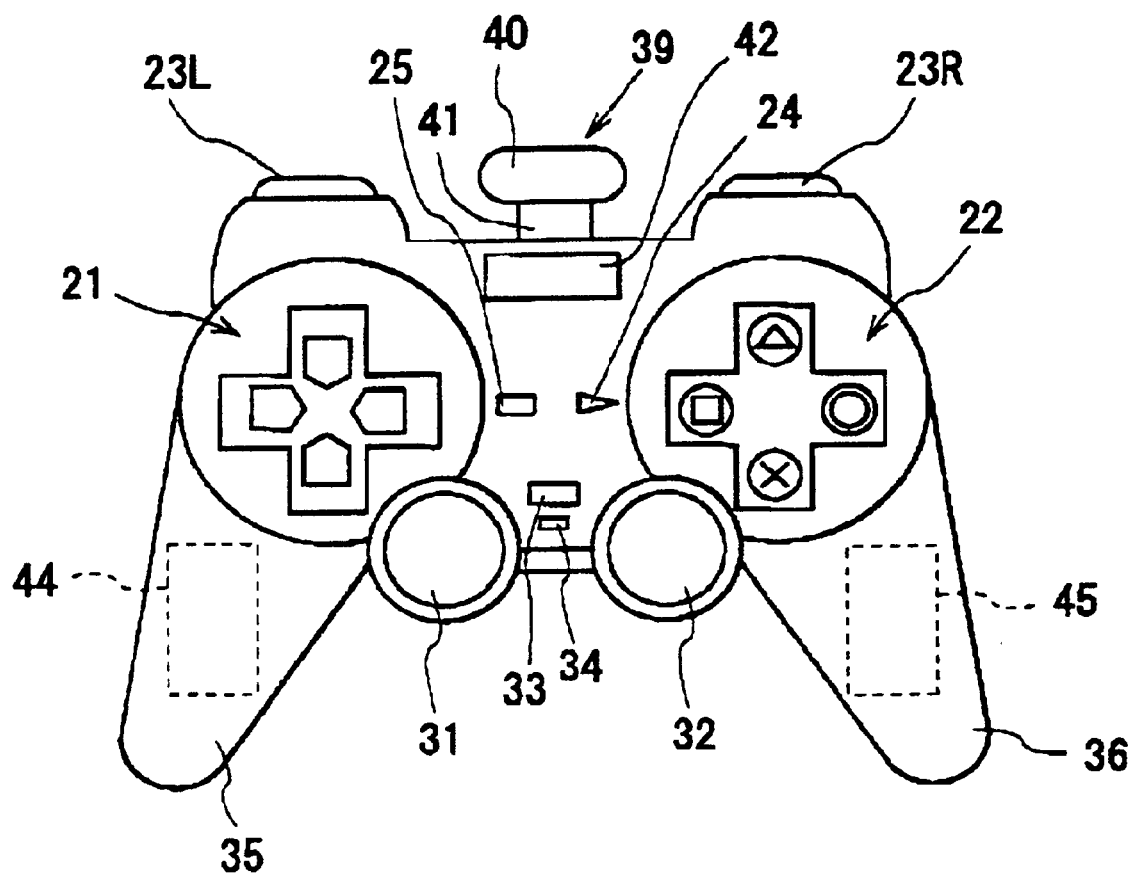
FIG. 2 is a front view of a game controller according to the embodiment.
Figure 3:
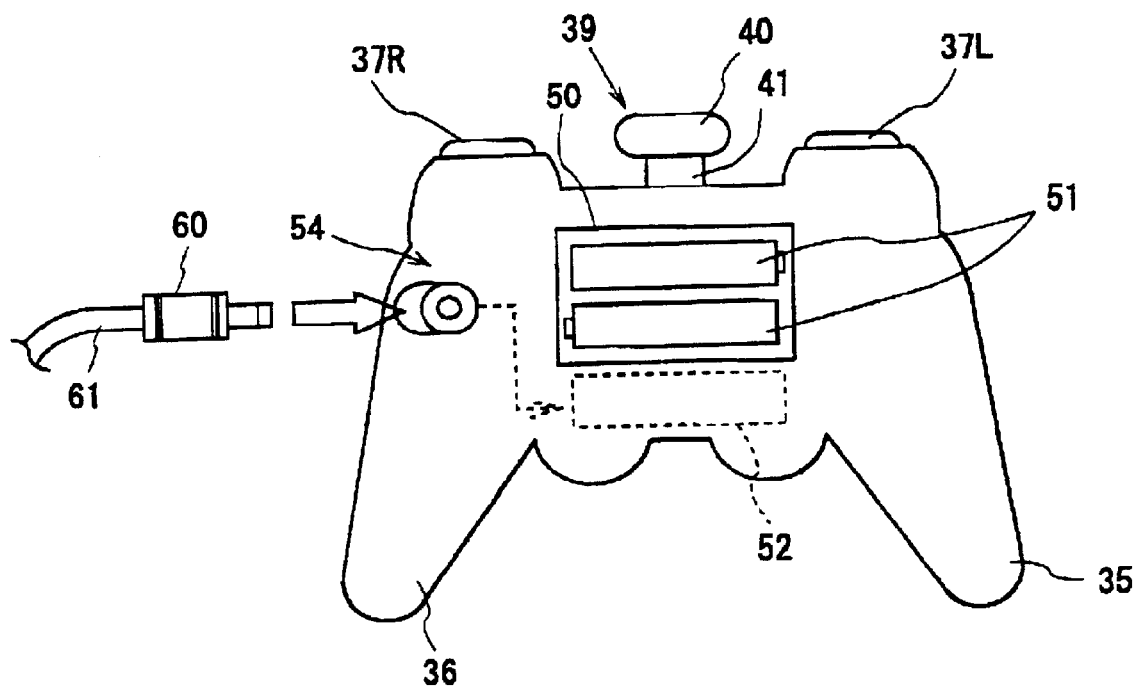
FIG. 3 is a rear view of the game controller of FIG. 2.

FIGS. 2 and 3 illustrate front and rear views of the game controller 20, respectively.

The game controller 20 has a left grip 35 held by a player's left palm; a right grip 36 held by the player's right palm; a left operation area 21 and a right operation area 22 operable by the individual thumbs of the left and right hands holding the grips 35, 36, respectively; a left analog control stick 31 and a right analog control stick 32 operable again by the left and right thumbs, respectively, in an analog manner (joy stick operation); a left first press button 23L and the right first press button 23R operable by the left and right first fingers, respectively; and a left second press button 37L and a right second press button 37R provided just below the first left press button 23L and the first right press button 23R, respectively, and operable by the left and right middle fingers.

The left operation area 21 is provided with "upward", "downward", "leftward" and "rightward" directional keys used by the player for moving, for example, a game character upward, downward, leftward or rightward. The "upward", "downward", "leftward" and "rightward" directional keys are also capable of specifying synthetic directions, so that pressing the "upward" directional key and the "rightward" directional key at the same time can issue an instruction for moving obliquely right upward. The same will apply to the other directional keys, and pressing, for example, the "downward" directional key and the "leftward" directional key at the same time can issue an instruction for moving obliquely left downward.

In the right operation area 22, there are provided four command buttons ("Δ", "□", "X" and "O" buttons having thereon embossed markings of Δ, □, X and 0, respectively) which are assigned with functions, such as setting and executing functions of game characters, differing by game application programs. For example, to the Δ button is allocated a function of displaying a menu. To the X button is allocated a function of canceling the selection of an item. To the 0 button is allocated a function of determining the selection of an item. To the □ button is allocated a function of selecting the display/non-display of a table or list.

Both of the analog control sticks 31 and 32 are held erect (not inclined) when not being operated. This position is referred to as home position. When a player inclines the analog control stick 31 or 32, the game controller 20 detects values of X-Y coordinates in accordance with the angle and direction of inclination of the operated analog control stick from its home position. The game controller 20 then sends the coordinate values as an operation output to the game machine main body 2.

The game controller 20 is further provided thereon with a mode selection switch 33 for selecting an operating mode of the left and right operation areas 21 and 22 and the analog control sticks 31 and 32, e.g., an analog operating mode in which the analog control sticks 31 and 32 are both active, or a digital operating mode in which the analog control sticks 31 and 32 are both inactive. The game controller 20 is further provided thereon with a light indicator 34, such as an LED (Light Emitting Diode) for informing the player of a selected operating mode. The game controller 20 is further provided thereon with a start button 24 for, e.g., starting or pausing a game or reproduction, and a select button 25 for, e.g., making the monitor screen 11 display thereon a menu, an operation panel, or the like. When the analog operating mode is selected with the mode selection switch 33, the light indicator 34 is turned on and each of the analog control sticks 31 and 32 becomes active. When the digital operating mode is selected, the light indicator 34 is turned off and each of the analog control sticks 31 and 32 becomes inactive.

When one of the above-described keys, buttons, and sticks is operated, the game controller 20 generates an operation signal in accordance with the operation, and sends the operation signal to the game machine main body 2 by wireless communication through the transceiver 39. That is, in this embodiment, the operation signal is sent to the game machine main body 2 through the transceiver 39.

The game controller 20 of this embodiment is further provided with a display unit 42 for displaying thereon letters or an image as occasion demands, as well as vibration mechanisms 44 and 45. The game controller 20 is further provided with a video input system, an audio input system, and an audio output system, though they are not illustrated.

Each of the vibration mechanisms 44 and 45 is for vibrating the body of the game controller 20 by rotating a weight that is eccentrically mounted on the rotational axis of an electric motor. The vibration mechanisms 44 and 45 operate following instructions from the game machine main body 2. The vibration mechanisms 44 and 45 are located in the left and right grips 35 and 36, respectively. In the game controller 20 of this embodiment, the vibration mechanisms 44 and 45 are driven to transmit two kinds of vibrations to the hands of the player who is playing a game. A bodily sensitive game thus can be realized.

The display unit 42 is located on the casing of the game controller 20 at a position that the player can easily see. The display unit 42 may be made of a liquid crystal display panel, an organic or inorganic EL (Electro Luminescence) panel, a segmental display, LEDs (Light Emitting Diodes), or the like. On the display unit 42 is displayed information for identifying each controller, information indicating the correspondence between the game controller 20 and a game character, or the like.

Although not illustrated in FIGS. 2 and 3, the video input system is for inputting image data obtained through a digital camera, video signals obtained through an incorporated CCD camera, or the like. The audio input system is for inputting audio signals electrically transduced through, e.g., a microphone. The audio output system is for outputting, e.g., a game sound or music through a loudspeaker in playing a game.

Principal Internal Components of Game Controller

Figure 4:
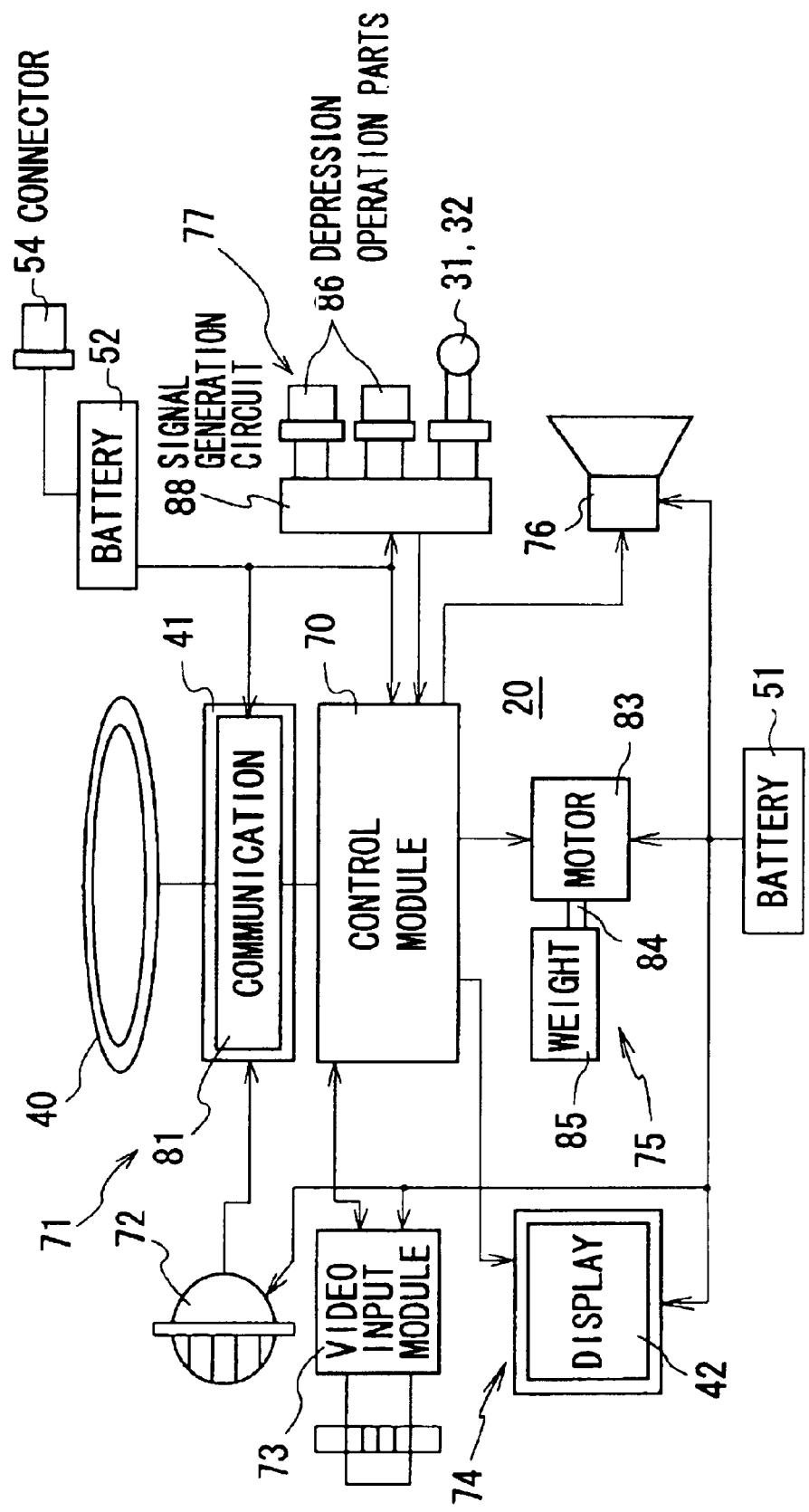
FIG. 4 is a block diagram electrically showing the construction of the game controller.

FIG. 4 illustrates internal electric components in units of modules of the game controller 20 with the transceiver 39.

The game controller 20 generally comprises a communication module 71, an operation module 77, a control module 70, a vibration module 75, an image display module 74, a video input module 73, an audio output module 76, and an audio input module 72.

The communication module 71 includes the transceiver 39 for wireless communication with the transceiver 12 of the game machine main body 2. The operation module 77 consists of depression operation parts 86, such as the press buttons, operation keys, and switches in the above-described operation areas and others, the analog control sticks 31 and 32, and a signal generation circuit 88 for generating electric signals in accordance with the operational states of the depression operation parts 86 and the analog control sticks 31 and 32, and so on. The control module 70 controls various functions of the game controller 20 (the vibration module 75, the image display module 74, the audio output module 76, etc.) following instructions received from the game machine main body 2 through the communication module 71. Besides, the control module 70 makes communication data based on depression operation signals and analog operation signals from the operation module 77, and signals from the video and audio input modules 73 and 72, and then sends the data to the game machine main body 2 through the communication module 71.

The vibration module 75 consists of the above-described vibration mechanisms 44 and 45 in each of which a weight 85 is eccentrically mounted on the rotational axis 84 of an electric motor 83 and the weight 85 is rotated with the motor 83 to generate vibrations. The image display module 74 consists of the above-described display unit 42 to display letters or an image following instructions from the game machine main body 2. The audio output module 76 consists of a loudspeaker, a non-illustrated audio signal amplifier, and so on. The audio output module 76 transduces electric audio data, which the game controller 20 has received from the game machine main body 2, into acoustic sound to be output through the loudspeaker. The audio input module 72 consists of a microphone through which external voice or sound is taken in. The video input module 73 takes in image data obtained from a digital camera connected through an external connection terminal, video data obtained through an incorporated CCD camera, or the like.

Classification of Modules

In the above-described modules, the indispensable modules for playing a video game are three, i.e., the communication module 71, the control module 70, and the operation module 77. Hereinafter, these three modules are referred to as basic modules.

If any one of the basic modules does not operate, a player's operation commands can not be transmitted to the game machine main body 2. As a result, playing the game becomes impossible.

In contrast, the remaining five modules (the vibration module 75, the image display module 74, the audio output module 76, the audio input module 72, and the video input module 73) are not always required (not indispensable) for playing the game though they can assist the player in playing the game or give the player many pieces of information.

Even if one or more of them does not operate, playing the game is possible. Hereinafter, these five modules are referred to as auxiliary modules.

Power Source for Game Controller

In case of connecting the game controller 20 with the game machine main body 2 by wireless as in this embodiment, the power necessary for the operation of the game controller 20 must be supplied from a battery or batteries.

In this embodiment, at least two batteries 51 and 52 are provided in the game controller 20. These two batteries 51 and 52 form two independent power supply systems which are used separately in accordance with the degree of importance or the power consumption of the above-described modules. Note that the number of batteries (the number of power supply systems) is not always limited to two and it may be three or more.

The reason why the two batteries 51 and 52 (the two independent power supply systems) are used in this embodiment will be described below.

Playing a video game may continue for a long time. In such a case, the battery for supplying power to the game controller 20 must endure the long play.

In particular, for the above-described basic modules indispensable for playing the game, the power supply must be ensured even when playing the game continues for a long time.

In contrast, the above-described auxiliary modules are not indispensable for playing the game.

In this embodiment, therefore, the two separate batteries 51 and 52 are used for the game controller 20, and thereby the power source for the basic modules, which are highly important for the operation of the game controller 20, is separated from the power source for the auxiliary modules, which are less important. In this manner, power to be supplied to the highly important basic modules is prevented from being consumed by the less important auxiliary modules. Thus, the power supply for the basic modules can be ensured for a long time.

More specifically, in this embodiment, as illustrated in FIG. 4, the communication module 71, control module 70, and operation module 77 as the basic modules are supplied with power from one battery 52, while the vibration module 72, image display module 74, audio output module 76, audio input module 72, and video input module 73 as the auxiliary modules are supplied with power from the other battery 51. Thus, the power supply is ensured for the communication module 71, the control module 70, and the operation module 77, any one of which is indispensable for the operation of the game controller 20.

In the example of FIG. 4, the power supply system for all auxiliary modules is completely separated from that for the basic modules. However, it is not always required that all such auxiliary modules have a separate power supply system from that for the basic modules. For example, auxiliary modules with low power consumptions may be incorporated in the power supply system for the basic modules.

In other words, the purpose of ensuring the basic operation of the game controller 20 for a long time may be realized by separating the power supply system for only one or more auxiliary modules with especially high power consumptions from that for the other modules with relatively low power consumptions.

In this embodiment, the auxiliary modules with high power consumptions are, e.g., the vibration module 75, the audio output module 76, and the image display module 73, none of which can be changed in design to reduce its power consumption and all of which require mechanical or physical kinetic energy or light emission energy. Therefore, separating the power supply system for the vibration module 75, the audio output module 76, and the image display module 73 from that for the other modules with low power consumptions can bring about a long-time operation of the game controller 20.

In the vibration module 75, the electric motor 83 is driven to rotate the weight 85 having a large mass. Besides, the power supplied to the electric motor 83, i.e., the rotational speed of the electric motor 83, determines the magnitude of vibrations generated. Thus, considerably high power must be supplied to the electric motor 83 to generate vibrations that can fully excite the player. This causes a remarkably high power consumption of the vibration module 75 in comparison with the other modules. Thus, separating only the power supply system for the vibration module 75 from that for the other modules may be effective for ensuring a long-time operation of the game controller 20.

As for the image display module 73, if a 7-segment LED or a reflection type liquid crystal display panel is used, for example, it can operate with a relatively low power consumption. Also, as for the audio output module 76, if an earphone or headphone connected through an external terminal is used in place of the incorporated loudspeaker, it can operate with a relatively low power consumption. These modules, therefore, may be incorporated in the power supply system for the basic modules.

As described above, in this embodiment, at least two batteries 51 and 52 are provided and they form two independent power supply systems separately used in accordance with the degree of importance or the power consumption of the functional components of the game controller 20, thereby realizing a long-time operation of the game controller 20.

Specific Example of Battery

In this embodiment, a secondary battery is used as the battery 52 for supplying power to the basic modules or other modules with low power consumptions. A primary battery is also usable for this purpose, of course, but it is preferable to use an economical secondary battery because it can repeatedly be used by charging. The secondary battery may be a NiCd (nickel-cadmium) secondary battery, a NiH (nickel-hydrogen) secondary battery, a lithium secondary battery, or the like. The kind of the secondary battery to be used is not particularly limited, but it is desirable that the secondary battery be available at a low cost, have a high energy density per unit mass, be capable of being repeatedly charged many times, and be less in so-called memory effect.

The battery 52 may be attached to an electronic circuit board in the game controller 20 detachably or undetachably. If the battery 52 is undetachable, for example, a connector 54 for inserting therein a plug 60 of an AC adapter for charging the battery 52 is provided at a predetermined position on the rear face of the game controller 20, as illustrated in FIG. 3. The connector 54 is electrically connected with the battery 52. In FIG. 3, the illustration of the body of the AC adapter is omitted and the plug 60 is attached to the distal end of a cable 61 connected to the AC adapter body.

On the other hand, in this embodiment, a primary battery is used as the battery 51 for supplying power to all auxiliary modules or only auxiliary modules with high power consumptions. In the example of FIG. 3, a set of alkali batteries of AAA (IEC) or R03 (JIS) type is used as the battery 51. The alkali batteries are set in a battery chamber 50 provided in the rear face of the game controller 20. FIG. 3 illustrates a state in which a cover of the battery chamber 50 is removed.

Of course, a secondary battery may be used as the battery 51. At present, however, a secondary battery sufficient to generate a high voltage to drive the electric motor of the vibration module 75 will be large in size and weighty in comparison with the alkali batteries of AAA (IEC) or R03 (JIS) type. Such a secondary battery is unsuitable for the game controller 20 that the player must hold by his or her hands for a long time. In this embodiment, therefore, the above alkali batteries are used because they are relatively light in weight and can generate a high voltage. If a secondary battery becomes available that is light in weight, can generate a high voltage, and is inexpensive, such a secondary battery can be used as the battery 51, of course.

As in this embodiment, if an exchangeable battery as described above is used as the battery 51 for supplying power to all auxiliary modules or to an auxiliary module with an especially high power consumption, when the charge of the battery has become weak because of a long play and, for example, vibrations given by the vibration module 75 have become weak, the battery can be exchanged for a new one. After the exchange, vibrations sufficient for exciting the player can be generated.

Conclusion of Embodiment

As described above, in this embodiment, electric components in the game controller 20 are classified into indispensable basic modules and the remaining auxiliary modules, or the basic modules and auxiliary modules with low power consumptions and the remaining auxiliary modules with high power consumptions, and separate power supply systems are provided for those modules, thereby realizing a long-time operation of the game controller 20.

Of course, the present invention is not limited to the above-described embodiment and various changes and modifications can be made without departing from the technical scope of the invention.

For example, in the above embodiment, the present invention is applied to a game controller of a video game system. The present invention is, however, not limited to such a game controller. The present invention is applicable to wireless controllers for controlling various electronic devices through wireless communication. A wireless controller to which the present invention is applicable includes indispensable basic modules and the remaining auxiliary modules, or the basic modules and auxiliary modules with low power consumptions and the remaining auxiliary modules with high power consumptions, as described above.

The number of batteries, i.e., the number of power supply systems, is not limited to two as in the above embodiment, and it may be three or more.

What is claimed is:

1. A wireless game controller for remote-controlling a game machine through wireless communication, the game controller comprising:

a body;

a plurality of internal components each utilizing electric power to operate, the plurality of components being classified into at least a first group of components whose members each have a relatively high rate of power consumption and a second group of components whose members each have a relatively low rate of power consumption;

the first group of components including a vibration module for vibrating the body of the game controller; and at least two power supplies, one of the power supplies supplying electric power to only the first group of components, and another of the power supplies supplying electric power to the second group of components.

2. The game controller according to claim 1, wherein the one power supply supplying electric power to only the first group of components is an exchangeable battery.

3. The game controller according to claim 1, wherein the another power supply supplying electric power to the second group of components is an incorporated secondary battery.

4. The game controller according to claim 3, further comprising:

a charge terminal for charging the secondary battery.

5. A wireless game controller for remote-controlling a game machine through wireless communication, the game controller comprising:

a body;

a plurality of internal components each utilizing electric power to operate, the plurality of components being classified into at least a first group of components whose members each have a relatively low degree of functional importance and a second group of components whose members each have a relatively high degree of functional importance;

the first group of components including a vibration module for vibrating the body of the game controller; and at least two power supplies, one of the power supplies supplying electric power to only the first group of components, and another of the power supplies supplying electric power to the second group of components.

6. The game controller according to claim 5, wherein the one power supply supplying electric power to only the first group of components is an exchangeable battery.

7. The game controller according to claim 5, wherein the another power supply supplying electric power to the second group of components is an incorporated secondary battery.

8. The game controller according to claim 7, further comprising:

a charge terminal for charging the secondary battery.

9. A wireless game controller for remote-controlling a game machine through wireless communication, the game controller comprising:

a body;

a plurality of internal components each utilizing electric power to operate, the plurality of components being classified into at least a first group of components whose members each have a relatively high rate of power consumption and a relatively low degree of functional importance, and a second group of components whose members each have a relatively low rate of power consumption and a relatively high degree of functional importance;

the first group of components including a vibration module for vibrating the body of the game controller; and at least two power supplies, one of the power supplies supplying electric power to only the first group of components, and another of the power supplies supplying electric power to the second group of components.

10. The game controller according to claim 9, wherein the one power supply supplying electric power to only the first group of components is an exchangeable battery.

11. The game controller according to claim 9, wherein the another power supply supplying electric power to the second group of components is an incorporated secondary battery.

12. The game controller according to claim 11, further comprising:

a charge terminal for charging the secondary battery.

* * * * *